(12) United States Patent
Koshimizu

(10) Patent No.: US 6,311,940 B1
(45) Date of Patent: Nov. 6, 2001

(54) STAND MEMBER FOR IMAGE READING APPARATUS AND IMAGE READING APPARATUS HAVING SUCH STAND MEMBER

(75) Inventor: Masato Koshimizu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/393,964

(22) Filed: Sep. 10, 1999

(30) Foreign Application Priority Data

Sep. 17, 1998 (JP) .................................................. 10-263021
Jul. 27, 1999 (JP) .................................................. 11-212833

(51) Int. Cl.[7] .................................................. F16M 11/00
(52) U.S. Cl. .................................... 248/176.1; 248/451
(58) Field of Search ............................... 248/176.1, 451, 248/454, 441.1, 446, 918

(56) References Cited

U.S. PATENT DOCUMENTS

| | | | |
|---|---|---|---|
| 5,397,091 | * 3/1995 | Tsuar | 248/441.1 |
| 5,582,373 | * 12/1996 | Baudot | 248/176.1 X |
| 5,762,304 | * 6/1998 | Hyatt | 248/176.1 |
| 5,918,907 | * 7/1999 | Ho | 248/441.1 X |

* cited by examiner

Primary Examiner—Ramon O. Ramirez
(74) Attorney, Agent, or Firm—Fitzpatrick, Cella, Harper & Scinto

(57) ABSTRACT

A stand member for an image reading apparatus includes a pair of front and rear protruded portions, wherein a lower part of the image reading apparatus disposed in a vertically installed condition is received between the pair of protruded portions to support the image reading apparatus in the vertically installed condition. A laid-down position of the image reading apparatus in a front-and-rear direction is regulated by the pair of protruded portions.

26 Claims, 16 Drawing Sheets

STAND MEMBER FOR IMAGE READING APPARATUS AND IMAGE READING APPARATUS HAVING SUCH STAND MEMBER

BACKGROUND OF THE INVENTION

1. Field of the Invention

The present invention relates to a stand member for holding a flat image reading apparatus for reading an image in a vertically installed condition, and an image reading apparatus having such a stand member.

2. Related Background Art

As an example of image reading apparatuses used with information processing units such as computers, there has been proposed a desk-top scanner.

FIGS. 16A to 16C show a schematic construction of a conventional scanner 209, where FIG. 16A is a plan view of the scanner, FIG. 16B is a front sectional view of the scanner and FIG. 16C is a left side view of the scanner.

An image recorded on an original P (to be read) rested on an original stage glass 200 is read by scanning a reading unit 201 under the original stage glass 200.

The reading unit 201 is designed so that it is reciprocally scan-moved under the original stage glass 200 by normal and reverse rotations of a motor 202.

A main body 208 of the scanner 209 is constituted by a combination of an upper cover 204 on which the original stage glass 200 is fixedly supported and a lower cover 205 on which the reading unit 201 is provided. Within the main body 208, there is provided an electric mounting portion 203 including a control board, a power source and the like.

A case where the scanner 209 having the above-mentioned arrangement is used in a vertically installed condition to save the installation space has been increased.

FIGS. 17 and 18 are views showing a manner that the conventional scanner 209 is used on a desk in a substantially vertically installed condition.

In FIG. 18, a stand 206 is pivotally mounted on the main body 208 via hinges 207. When the scanner 209 is used in the vertically installed condition, the stand 206 is rotated around the hinges 207 from a position A to a position B so that the main body 208 of the scanner 209 is supported by the stand 206 not to lay the scanner down laterally.

In this condition, when the original is set on the original stage glass 200, the image on the original can be read in the vertically installed condition as is in a case where the scanner is installed horizontally.

However, in the scanner 209 having the above-mentioned construction, when the scanner is used in the vertically installed condition, if there is unevenness on an installation surface D, since the main body 208 is not supported stably, slight external force may lay the scanner down laterally.

SUMMARY OF THE INVENTION

An object of the present invention is to provide a stand member capable of holding a flat image reading apparatus in a vertically installed condition in such a manner that the image reading apparatus is hard to be laid down laterally, and an image reading apparatus having such a stand member.

The stand member for the image reading apparatus according to the present invention has a pair of protruded portions, and, in the stand member, a lower part of the flat image reading apparatus disposed in the vertically installed condition to read an original is received between the pair of protruded portions to support the image reading apparatus disposed in the vertically installed condition, and laid-down of the image reading apparatus in a front-and-rear direction is regulated by the pair of protruded portions.

In the stand member for the image reading apparatus according to the present invention, among the pair of protruded portions, a height of a rear side protruded portion may be greater than a height of a front side protruded portion.

In the stand member for the image reading apparatus according to the present invention, the pair of protruded portions may hold the image reading apparats in the vertically installed condition in such a manner that the image reading apparatus is inclined rearwardly.

In the stand member for the image reading apparatus according to the present invention, the stand member may be formed from synthetic resin.

In the stand member for the image reading apparatus according to the present invention, among the pair of protruded portions, a front side protruded portion may have a fixing means for holding a lid opening/closing means for closely contacting an original rested on an original resting stage of the image reading apparatus with the original resting stage in a closed condition.

The image reading apparatus having such a stand member of the present invention has a flat main body including an original resting stage on which an original is rested, an image reading means for reading the original rested on the original resting stage, and a lid opening/closing means for closely contacting the original rested on the original resting stage with the original resting stage and is used in a laid-down condition, and, the image reading apparatus can be used in a manner that the main body is in a vertically supported condition by means of one of the above-mentioned stand member detachably provided on the main body.

In the image reading apparatus having the stand member of the present invention, the main body may be supported on the installation surface by resting the stand member provided at one end of the main body and the other end of the main body on the installation surface.

In the image reading apparatus having the stand member of the present invention, the main body may be connected to the stand member by a connection means, and the connection means may include a portion to be engaged (engaged portion) provided in a back surface (rear surface) of the main body, and an engagement portion provided on a rear side protruded portion (among the pair of protruded portions) and capable of detachably engaging by the engaged portion.

In the image reading apparatus having the stand member of the present invention, one of the engaged and engagement portions may be a recessed portion and the other may be a protrusion.

In the image reading apparatus having the stand member of the present invention, the detachably engaged direction along which the engaged and engagement portions are engaged with each other may be an up-and-down direction.

In the image reading apparatus having the stand member of the present invention, the recessed portion and the protrusion may be directed in an up-and-down direction.

In the image reading apparatus having the stand member of the present invention, the detachably engaging direction along which the engaged and engagement portions are engaged with each other may be a left-and-right direction.

In the image reading apparatus having the stand member of the present invention, the recessed portion and the protrusion may be directed in a left-and-right direction.

In the image reading apparatus having the stand member of the present invention, the main body may be provided at its back surface with a plurality of projections for supporting the main body on an installation surface when the main body is laid down, and, among the plurality of projections, the projection located downwardly when the main body is positioned in a vertically installed condition may also act as the engaged portion.

In the image reading apparatus having the stand member of the present invention, among the pair of protruded portions, a top portion of the front side protruded portion is shaped to be complementary to or to mate with an edge of the opening/closing means not to interfere with the opening and closing of the opening/closing means.

BRIEF DESCRIPTION OF THE DRAWINGS

FIG. 16A is a plan view of the scanner, FIG. 16B is a sectional view looked at from a front side in FIG. 16A and FIG. 16C is a side view looked at from the left in FIG. 16A;

DETAILED DESCRIPTION OF THE PREFERRED EMBODIMENTS

The present invention will now be described in connection with embodiments thereof with reference to the accompanying drawings.

First Embodiment

Figure 1:
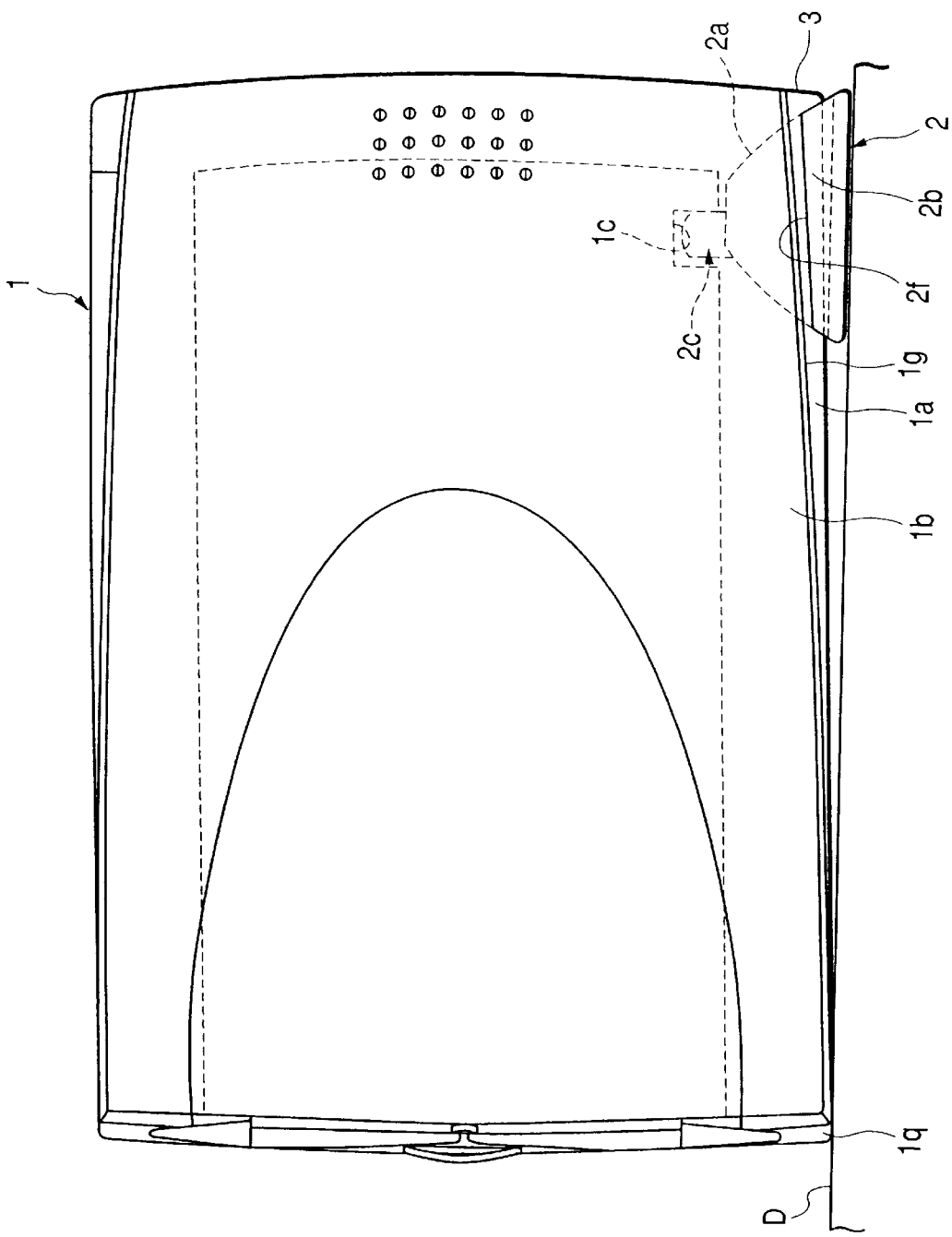
FIG. 1 is a front view showing a stand member according to a first embodiment of the present invention, and a scanner as an image reading apparatus having such a stand member.
Figure 2:
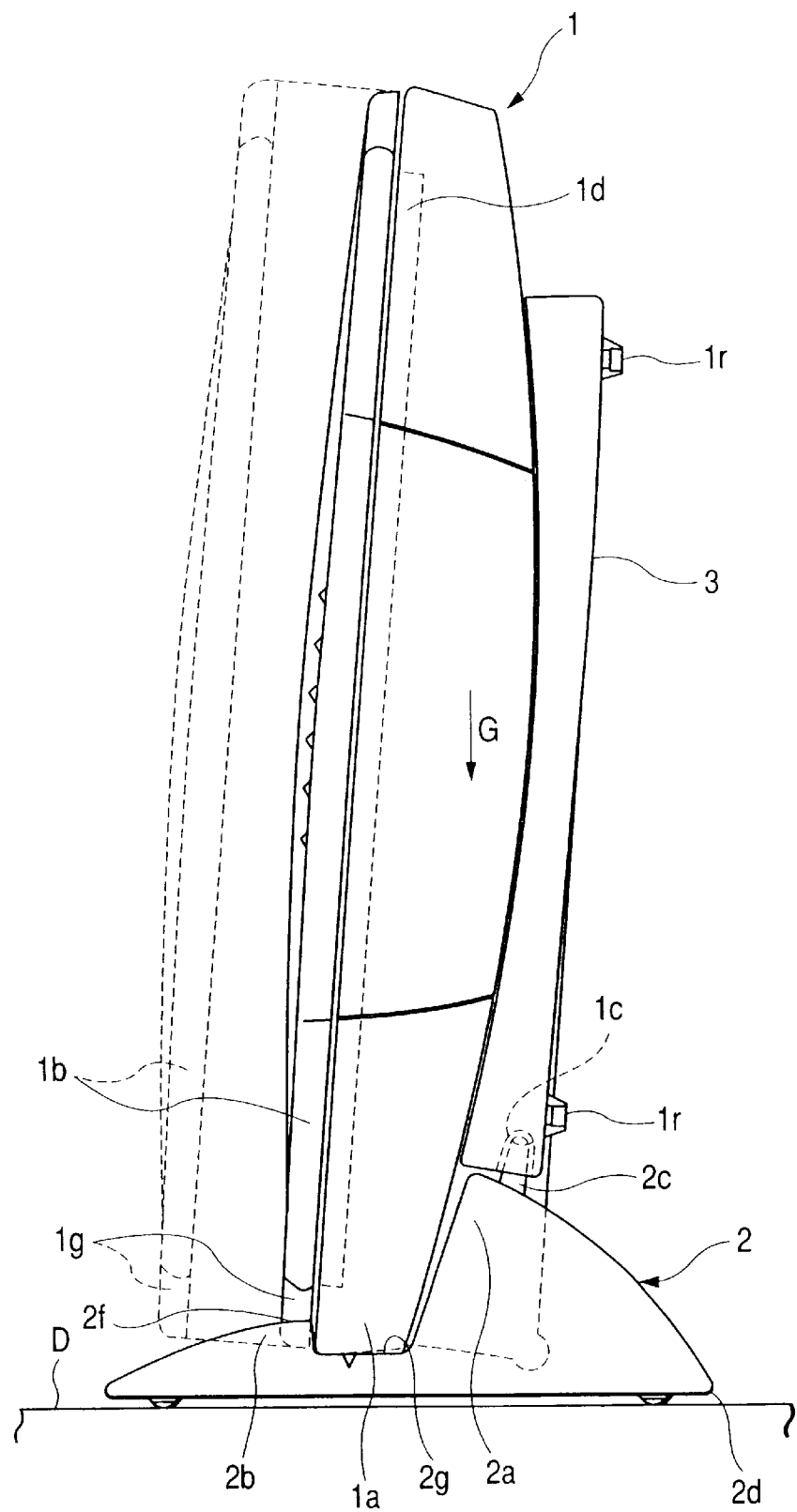
FIG. 2 is a side view showing the stand member according to the first embodiment, and the scanner as the image reading apparatus having such a stand member.

FIG. 1 is a front view showing a condition that a scanner 1 as a flat image reading apparatus is vertically installed by using a stand member 2 according to the present invention, and FIG. 2 is a right side view showing the scanner and the stand member.

Incidentally, as is in the above-mentioned conventional scanner 209, although the scanner 1 includes an original stage glass, a reading unit, a motor and an electric mounting portion, since they are the same as those in the conventional scanner, they are not illustrated in the drawings.

However, as shown in FIG. 1, the stand member 2 (fully described later) is adapted to be mounted to a main body 3 of the scanner 1, and, in order to prevent interference between the stand member 2 and a pressure plate (opening/closing means) 1b, a lower edge 1g of the pressure plate 1b is curved upwardly as the edge extends from left to right. Further, four projections (legs) 1r are provided on the main body 3 of the scanner 1 so that the scanner can be used in a laid-down condition.

In FIG. 1, when the scanner 1 is used in a vertically installed condition for saving a space, the detachable stand member 2 is mounted on a side surface 1a of a lower frame of the main body 3 of the scanner 1.

Figure 3:
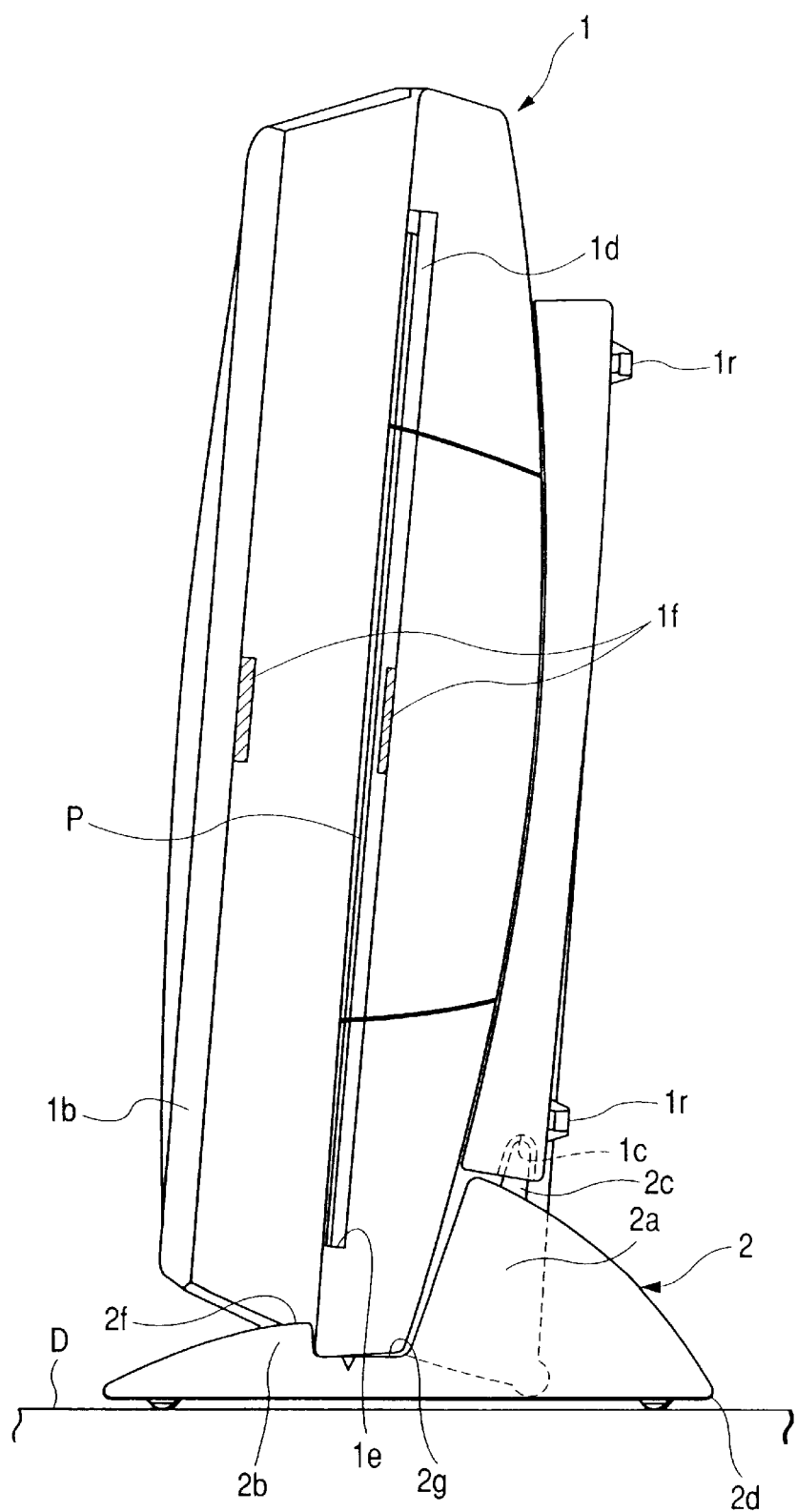
FIG. 3 is a side view showing the stand member according to the first embodiment, and the scanner as the image reading apparatus having such a stand member, in a condition that a pressure plate is opened.
Figure 4:
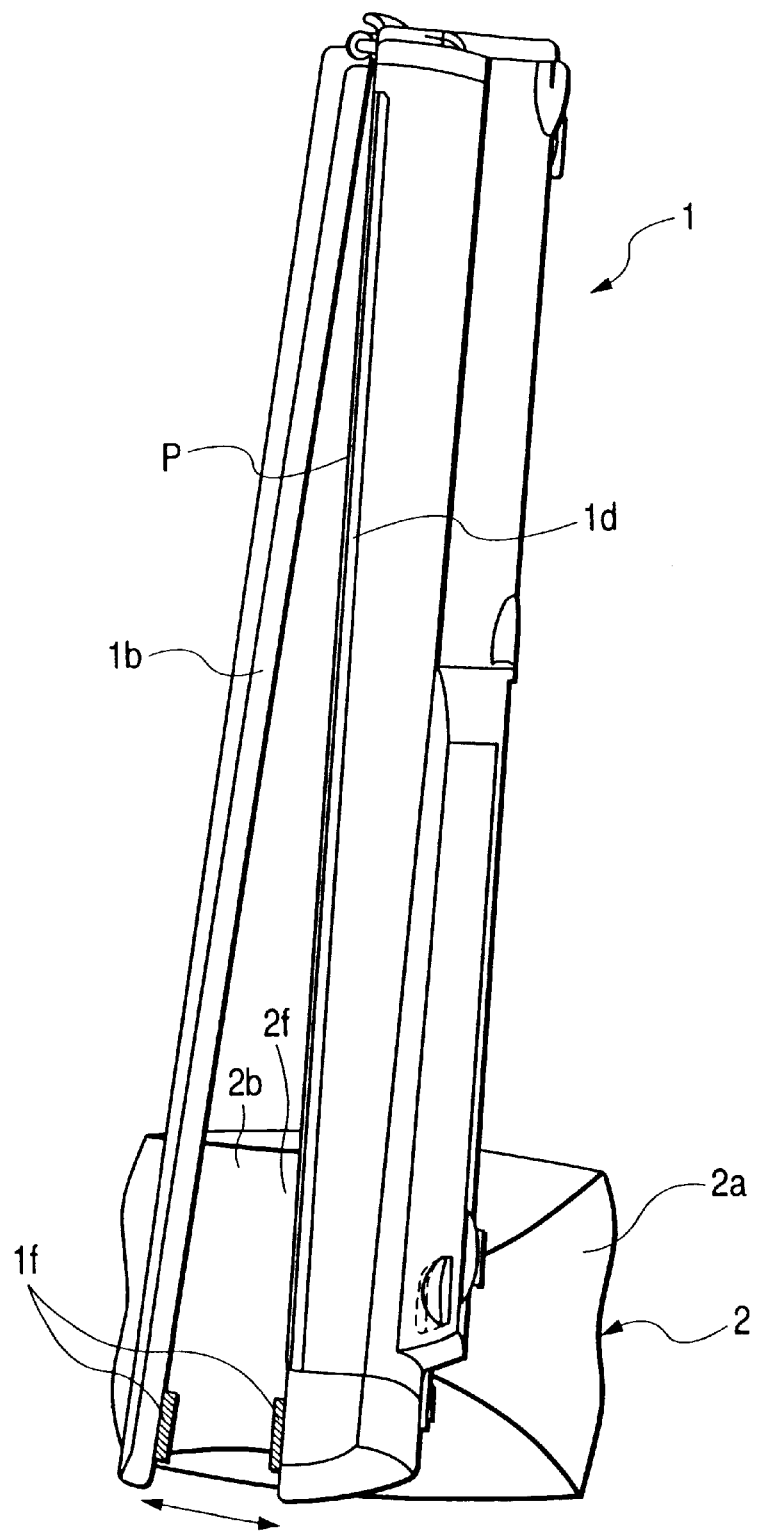
FIG. 4 is a plan view showing the stand member according to the first embodiment, and the scanner as the image reading apparatus having such a stand member, in the condition that the pressure plate is opened.
Figure 5:
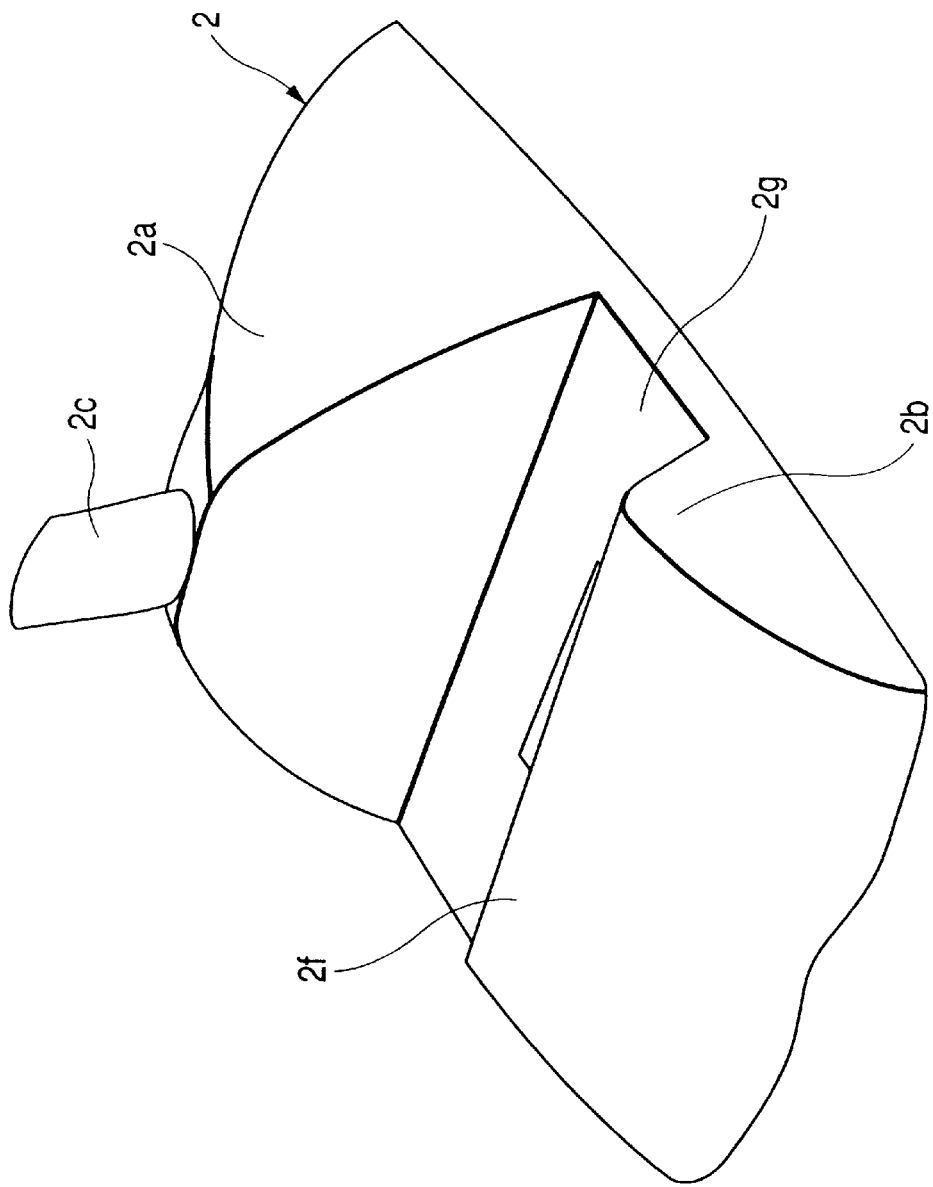
FIG. 5 is a perspective view of the stand member according to the first embodiment.

A configuration of the stand member 2 is defined by two mountain-like support portions (front side protruded portion and rear side protruded portion) 2b and 2a, as shown in FIG. 3 (side view) and FIG. 5 (perspective view). A top portion 2f of the front end support portion 2b is obliquely shaped to mate with the lower edge 1g of the pressure plate 1b of the main body 3 of the scanner 1. Incidentally, a main body receiving portion 2g is defined by two mountain-like support portions 2a, 2b.

Further, a protrusion 2c to be fitted into a recessed portion 1c of the lower frame of the scanner 1 is formed on a top portion of the rear end support portion 2a.

In the illustrated embodiment, the stand member 2 is formed from synthetic resin material such as plastic. Thus, the stand member 2 can be manufactured cheaply and does not damage the main body of the scanner 1.

When the main body 3 of the scanner 1 is mounted to the stand member 2, since a front surface of the rear end support portion 2a is inclined rearwardly, a right end lower portion of the main body 3 is pinched between and supported by the front end support portion 2b and the rear end support portion 2a of the stand member 2 (i.e., received into the main body receiving portion 2g), so that an original stage glass (original stacking plate) 1d is slightly inclined rearwardly and a gravity center G (refer to FIG. 2) of the main body 3 of the scanner 1 is positioned sufficiently near the rear end support portion 2a between the front end support portion 2b and the rear end support portion 2a and a rear end 2d of the stand member 2. The scanner 1 is supported by a front-and-rear width (width in left-and-right direction in FIG. 2) of the stand member 2 and a left end 1q (in FIG. 1) of the main body 3 (three-point supporting).

Accordingly, even if the scanner 1 is pushed rearwardly (right in FIGS. 2 and 3), the scanner is hard to knock over.

Further, since the protrusion 2c is provided on the stand member 2 and the recessed portion Ic for receiving the protrusion 2c is formed in the side surface 1a of the lower frame of the main body 3 of the scanner and since the front-and-rear width of the stand member 2 is greater than a thickness (thickness in left-and-right direction in FIG. 2) of the scanner 1, if any force trying to laying the scanner 1 down acts on the main body 3 accidentally, the scanner is not laid down laterally.

As shown in FIG. 3, when the operator sets an original P on the original stage glass 1d, since the front end support portion 2b is positioned not to interfere with the opening and closing of the pressure plate 1b, the pressure plate can be opened and closed in a normal manner.

As shown in FIG. 3, in a condition that the pressure plate 1b is opened, the original P can be set along an original abut reference 1e, and, when the pressure plate 1b is closed by its own weight, the original P can be closely contacted with the original stage glass 1d.

In this case, magnets 1f may be provided on opposed surfaces between the pressure plate 1b and the lower frame 1a to closely contact the original P with the original stage glass 1d more positively, thereby reading an image on the original more correctly to obtain better image quality. Incidentally, in place of the magnets, face fasteners may be used.

Second Embodiment

Figure 6:
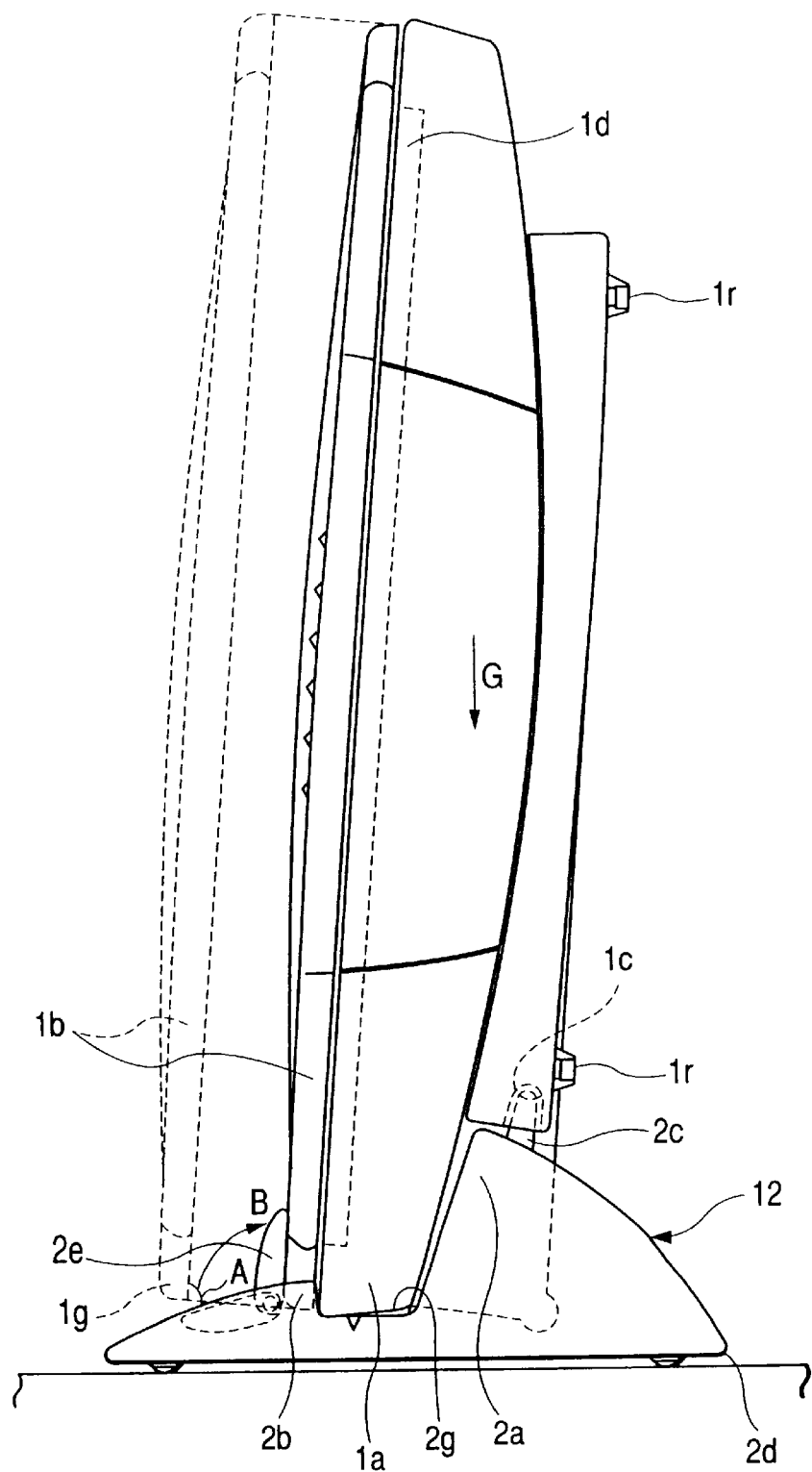
FIG. 6 is a side view showing a stand member according to a second embodiment of the present invention, and a scanner as an image reading apparatus having such a stand member.

FIG. 6 shows a construction of a stand member 12 (for the scanner 1) according to a second embodiment of the present invention. The same elements as those in the stand member 2 of the first embodiment are designated by the same reference numerals and explanation thereof will be omitted.

The stand member 12 according to the second embodiment comprises a front end support portion 2b having a shiftable (capable of raising and falling) lever member 2e. When the pressure plate 1b is opened, the lever member 2e is retarded to a position A not to interfere with the opening and closing of the pressure plate 1b, and, after the pressure plate 1b is closed, the lever member is rotated to a position B where the lever member urges the pressure plate 1b to closely contact the original P with the original stage glass 1d.

By providing such a lever member 2e, the scanner can be fixed to the stand member 12 more stably.

Third Embodiment

Figure 7:
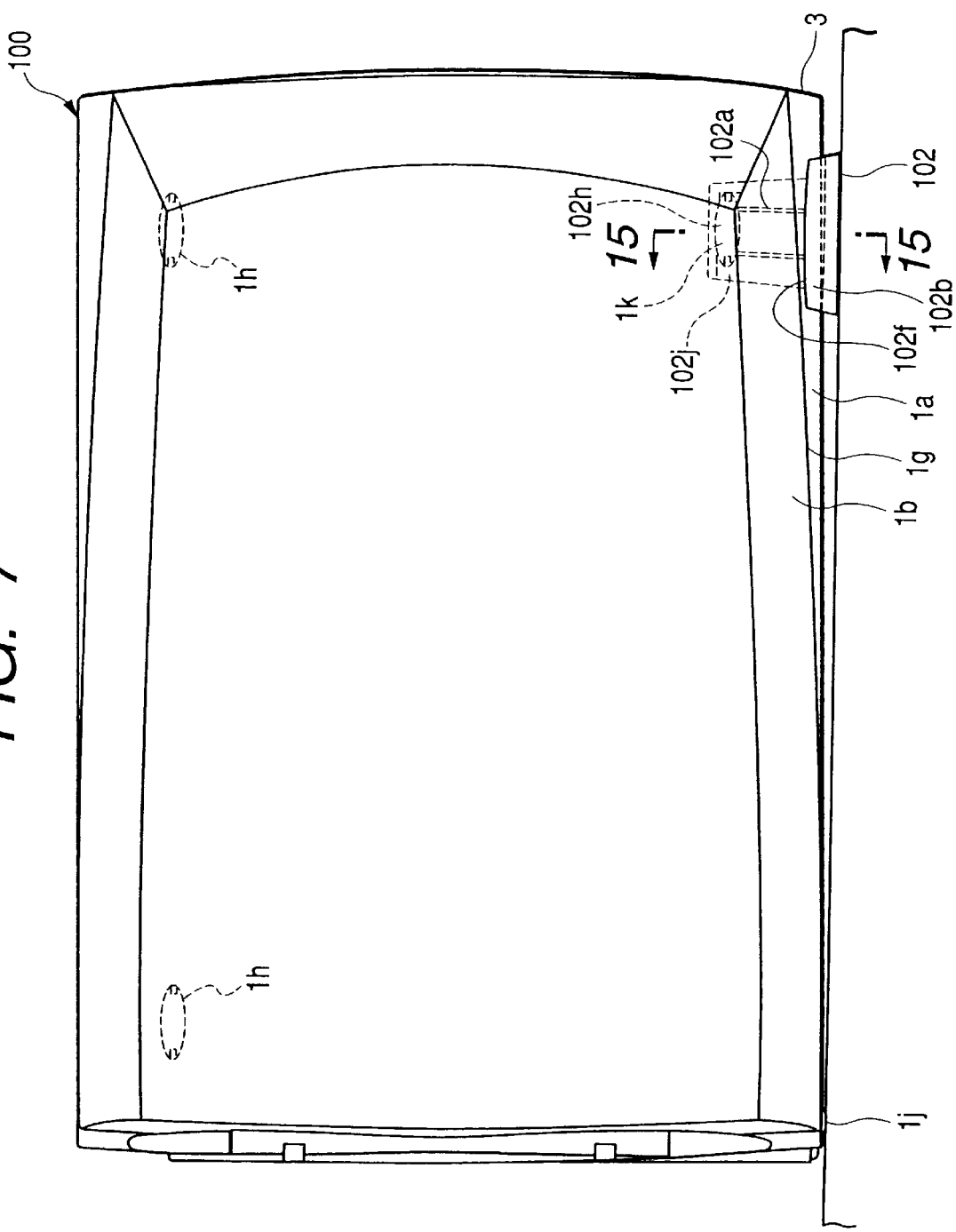
FIG. 7 is a front view showing a stand member according to a third embodiment of the present invention, and a canner as an image reading apparatus having such a stand member.
Figure 8:
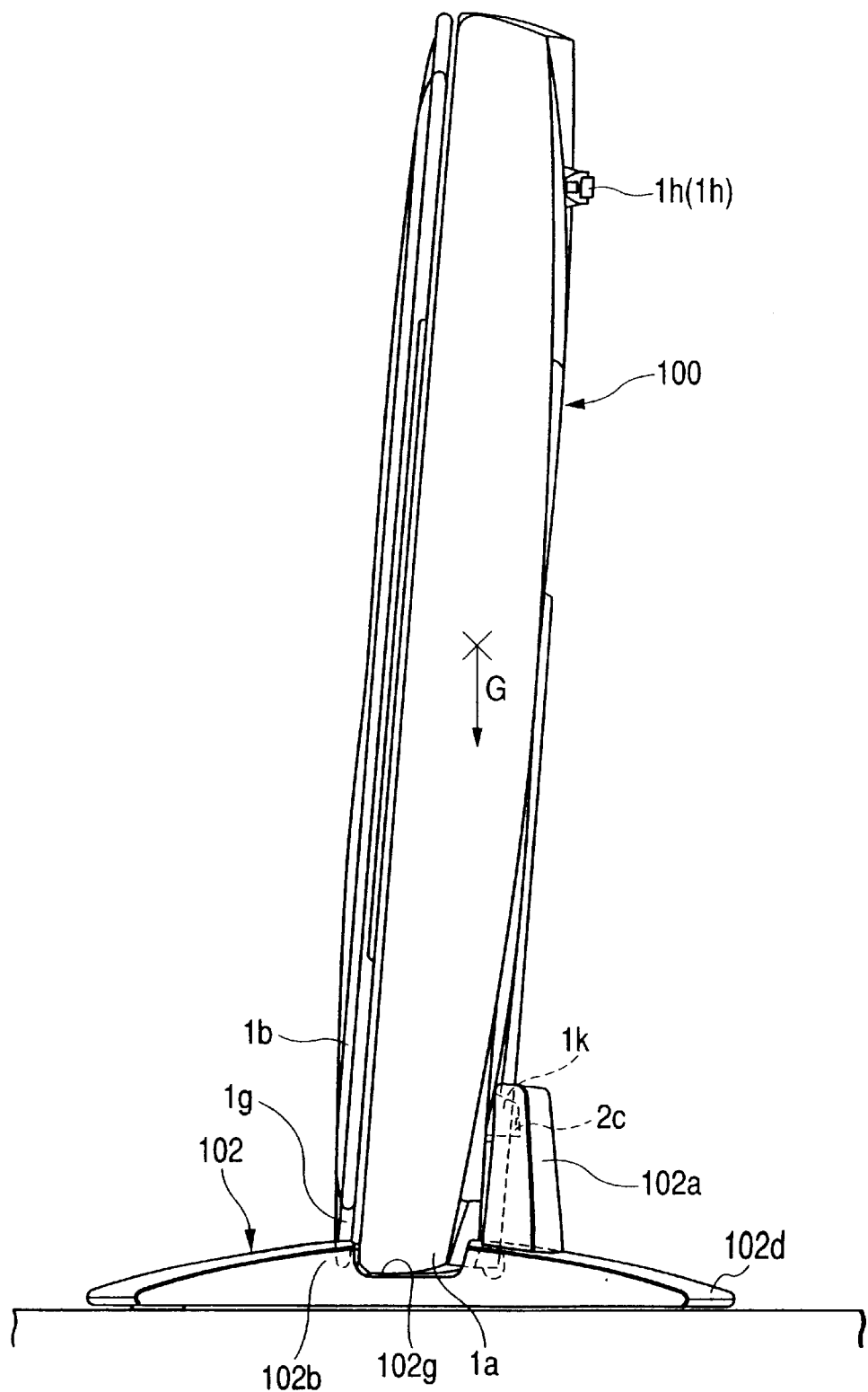
FIG. 8 is a side view showing the stand member according to the third embodiment, and the scanner as the image reading apparatus having such a stand member.

FIG. 7 is a front view showing a condition that a scanner (flat image reading apparatus) 100 is set in a vertically installed condition by using a stand member 102 according to the present invention, and FIG. 8 is a right side view of FIG. 7.

Incidentally, as is in the above-mentioned conventional scanner 209, although the scanner 100 includes an original stage glass, a reading unit, a motor and an electric mounting portion, since they are the same as those in the conventional scanner, they are not illustrated in the drawings.

Figure 9:
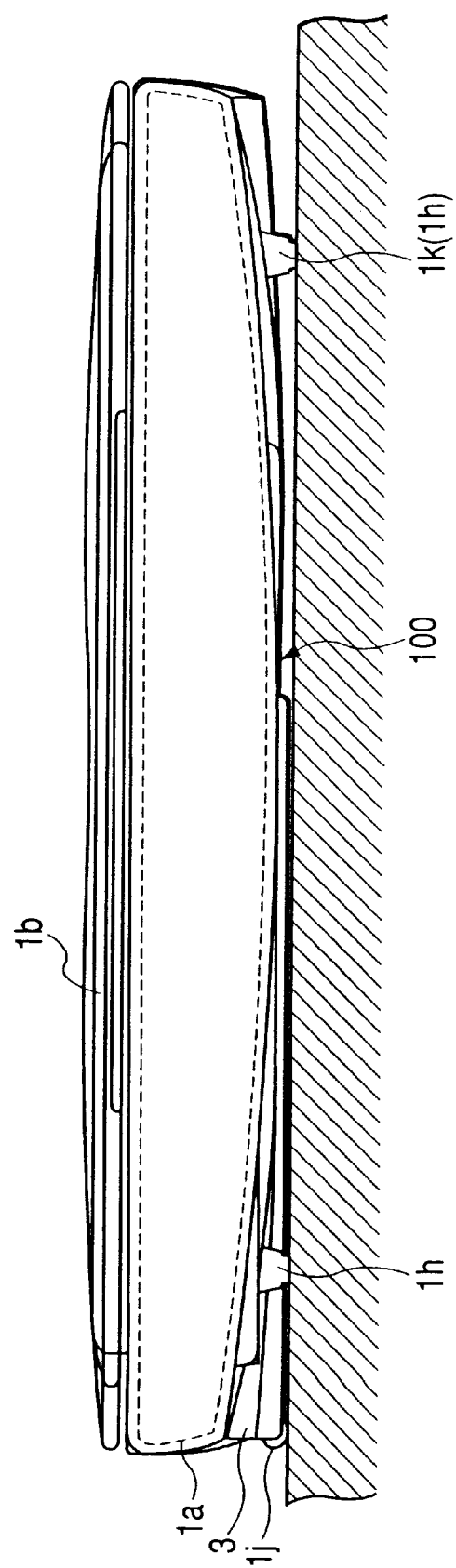
FIG. 9 is a front view of the scanner as the image reading apparatus having the stand member according to the third embodiment, in a condition that the scanner is laid down on an installation surface.

However, as shown in FIG. 9, a main body 3 of the scanner 100 has projections 1h, 1h, 1k (FIG. 7) which act as legs when the scanner 100 is rested on an installation surface D in a laid-down condition, and an arc portion 1j protruded from a corner of the main body 3. Accordingly, in the scanner 100 shown in FIG. 7, the same elements as those in the scanner 1 shown in FIG. 1 are designated by the same reference numerals and explanation thereof will be omitted.

In FIG. 7, when the scanner 100 is used in a vertically installed condition for saving a space, the detachable stand member 102 is mounted on a side surface 1a of a lower frame of the main body 3 of the scanner 100.

A configuration of the stand member 102 is defined by support portions (rear side protruded portion and front side protruded portion) 102a, 102b, as shown in FIGS. 8, 10 to 13 and 15. A top portion 102f of the front end support portion 102b is obliquely shaped to mate with the lower edge 1g of the pressure plate 1b of the main body 3 of the scanner 100. Incidentally, a longitudinal main body receiving portion 102g is defined by the support portions 102a, 102b.

Further, a front surface portion of the rear end support portion 102a is provided with a recessed portion 102h for fitting a projection 1k of the scanner 100.

In the illustrated embodiment, the stand member 102 is formed from synthetic resin material such as plastic. Thus, the stand member 102 can be manufactured cheaply and does not damage the main body of the scanner 100.

Figure 14:
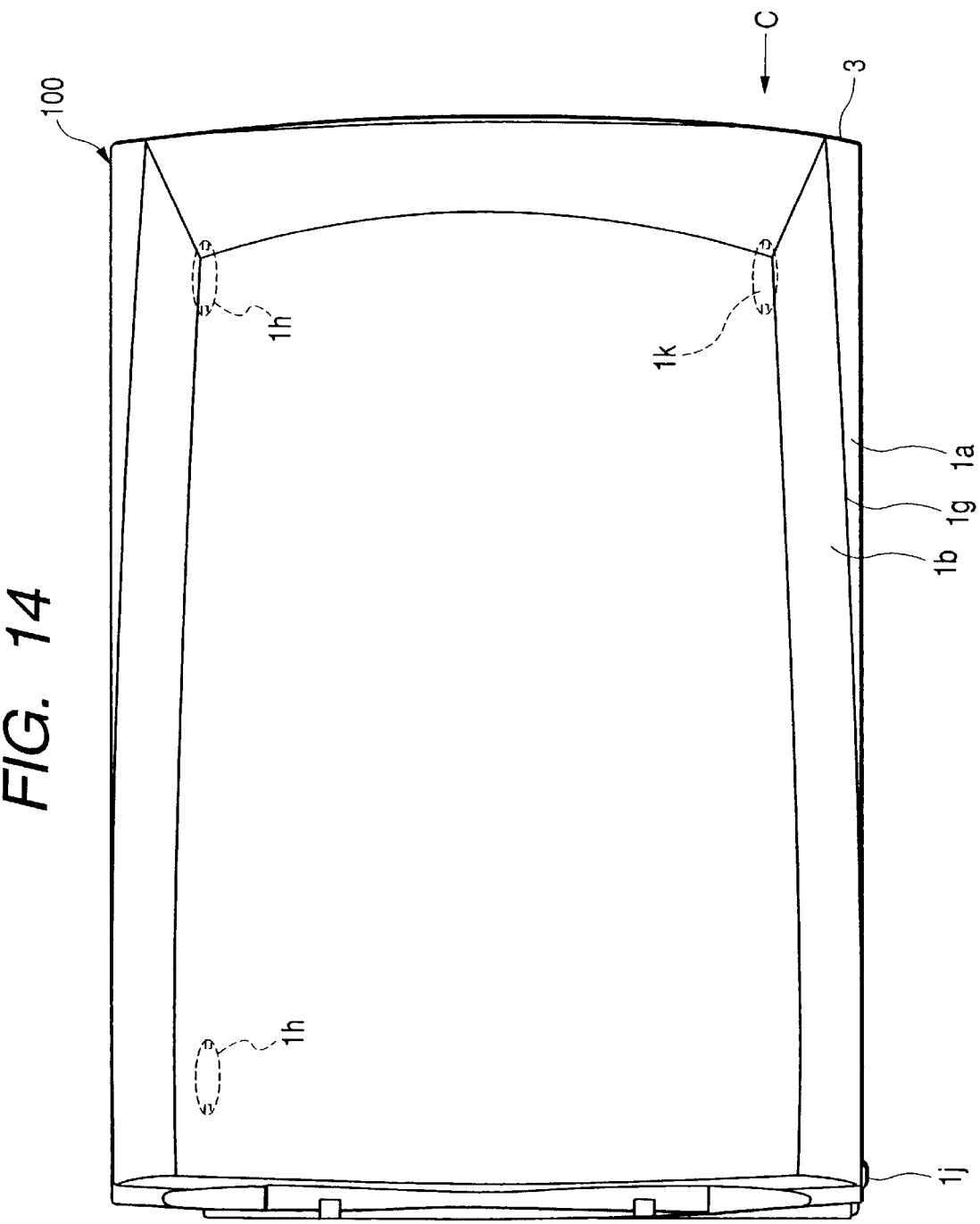
FIG. 14 is a front view of the scanner as the image reading apparatus having the stand member according to third embodiment, in a condition that the scanner is vertically installed.
Figure 15:
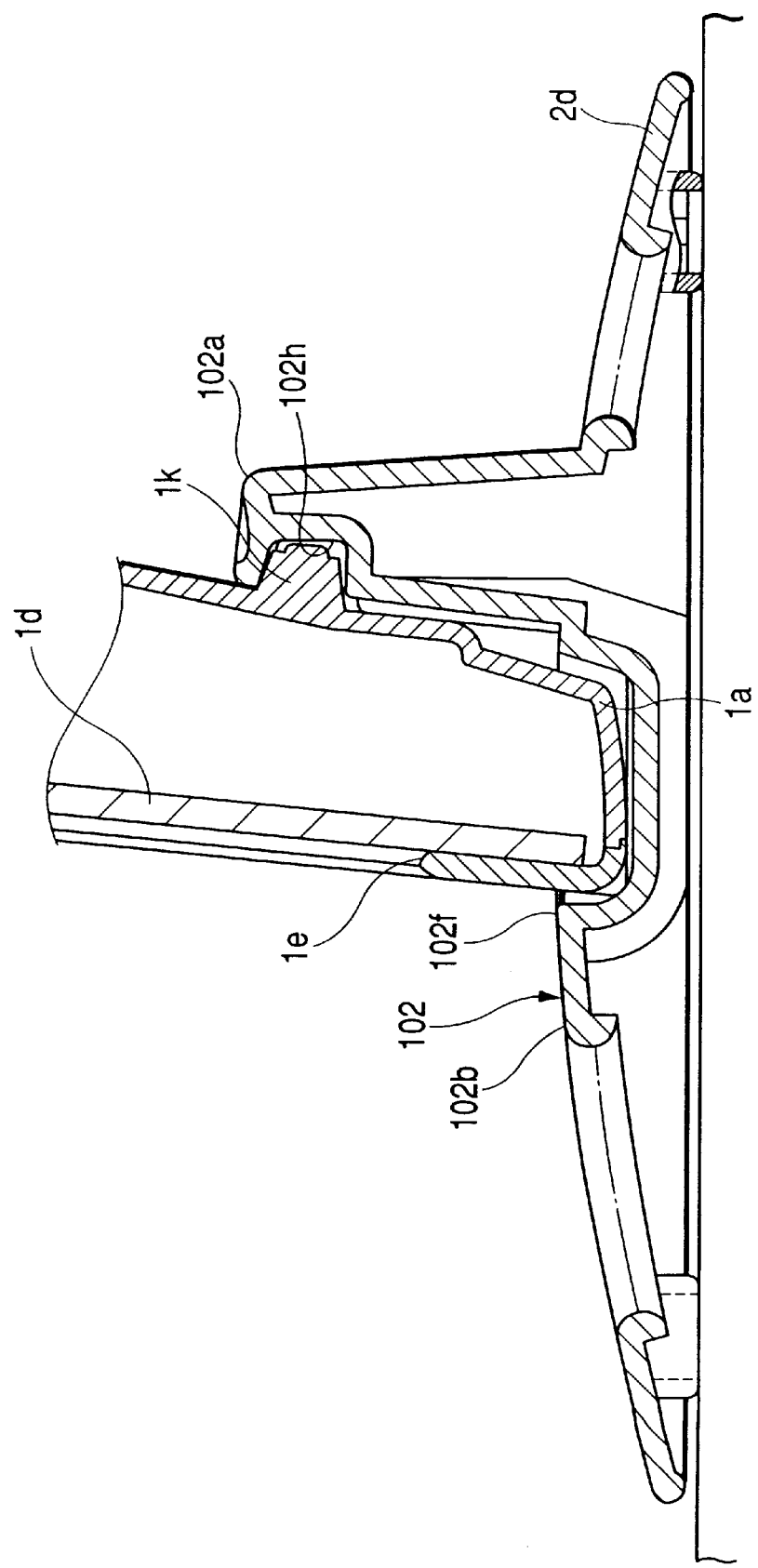
FIG. 15 is a sectional view taken along the line 15—15 in FIG. 7.
Figure 16A:
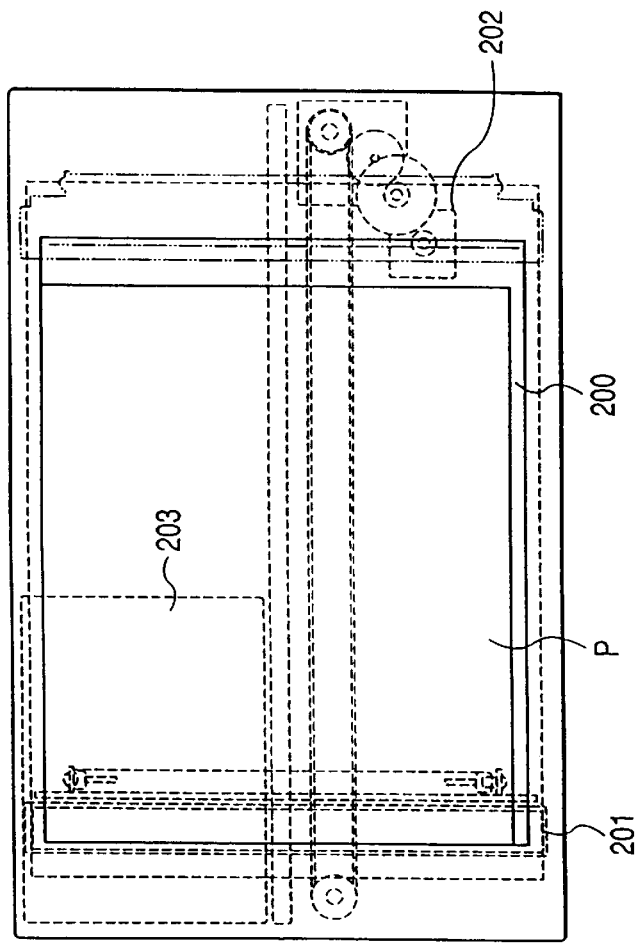
FIGS. 16A, 16B and 16C show a schematic construction of a conventional scanner 209, where
Figure 16C:
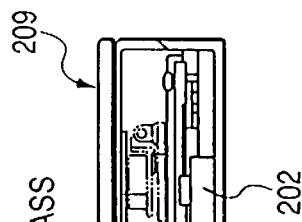
Figure 16B:
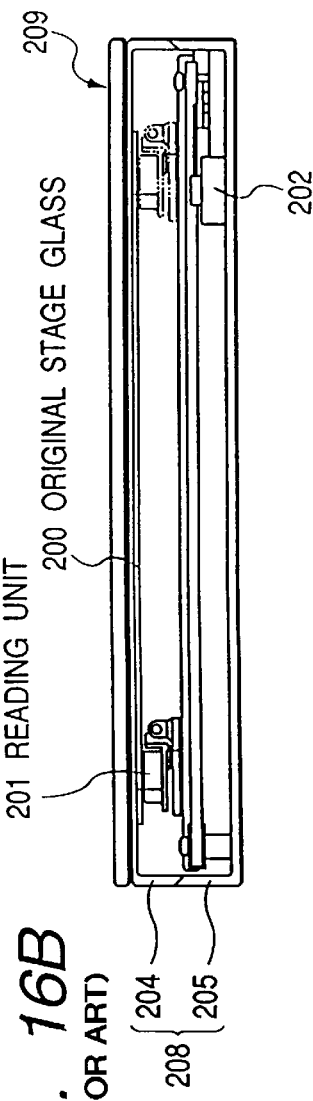
Figure 18:
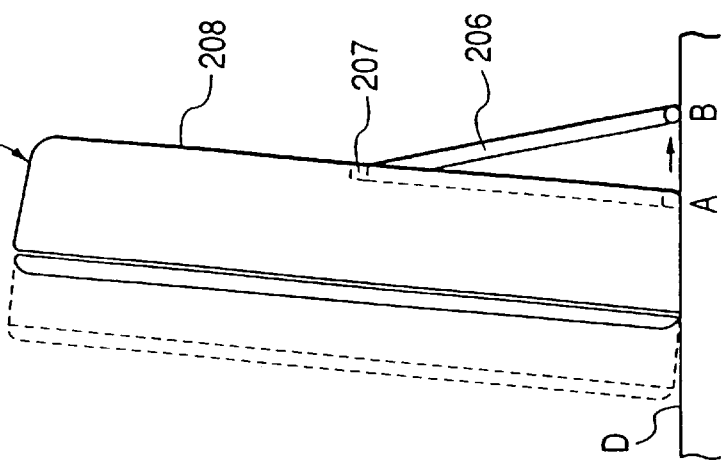
FIG. 18 is a view looked at from the left in FIG. 17.
Figure 17:
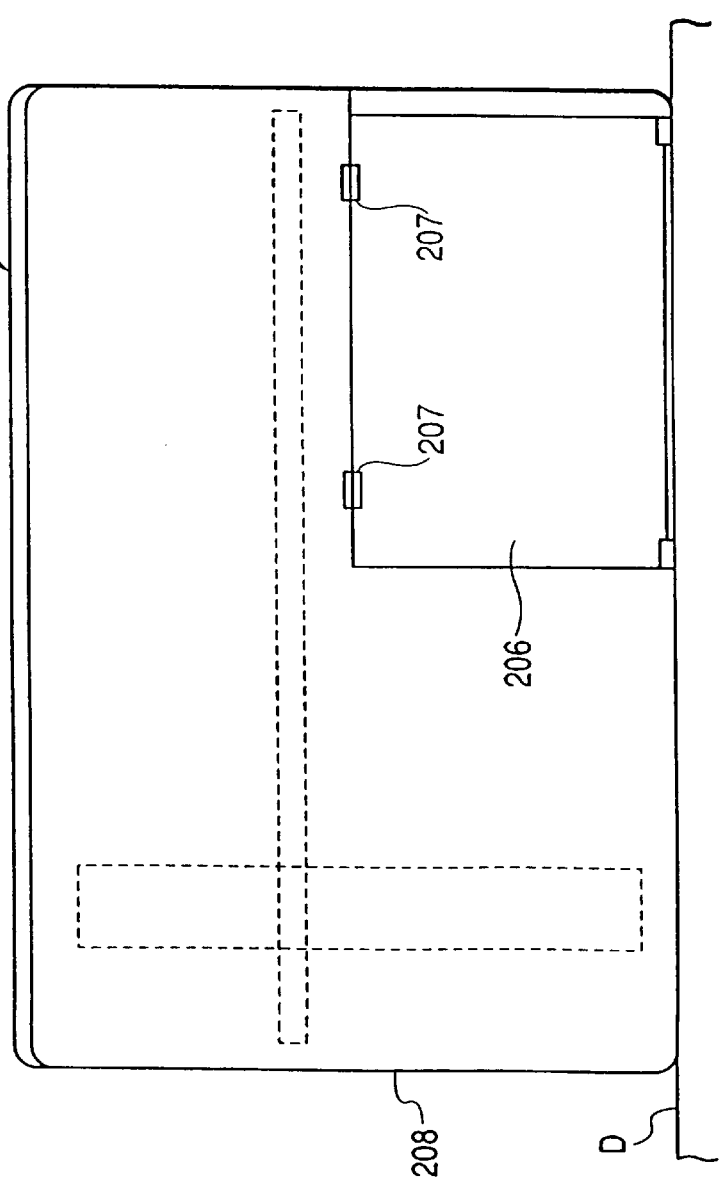
FIG. 17 is a rear view showing a condition that the convention image reading apparatus is vertically installed.

When the stand member 102 is mounted on the main body 3 of the scanner 100 from a direction shown by the arrow C in FIG. 14, a right end lower portion of the main body 3 is pinched between and supported by the front end support portion 102b and the rear end support portion 102a of the stand member 102 (i.e., received into the main body receiving portion 102g), so that, as shown in FIG. 8, the original stage glass 1d is slightly inclined rearwardly (with respect to a vertical plane) and a gravity center G of the main body 3 of the scanner 100 is positioned sufficiently near the rear end support portion 102a between the front end support portion 102b and the rear end support portion 102a and a rear end 102d of the stand member 102.

A left end lower portion of the main body 3 of the scanner 100 is supported by the arc portion 1j. That is to say, the scanner 100 is supported by a front-and-rear width (width in left-and-right direction in FIG. 8) of the stand member 102 and the arc portion 1j of the main body 3 (three-point supporting).

Accordingly, even if the scanner 100 is pushed rearwardly (right in FIGS. 8 and 10), the scanner is hard to knock over.

Figure 11:
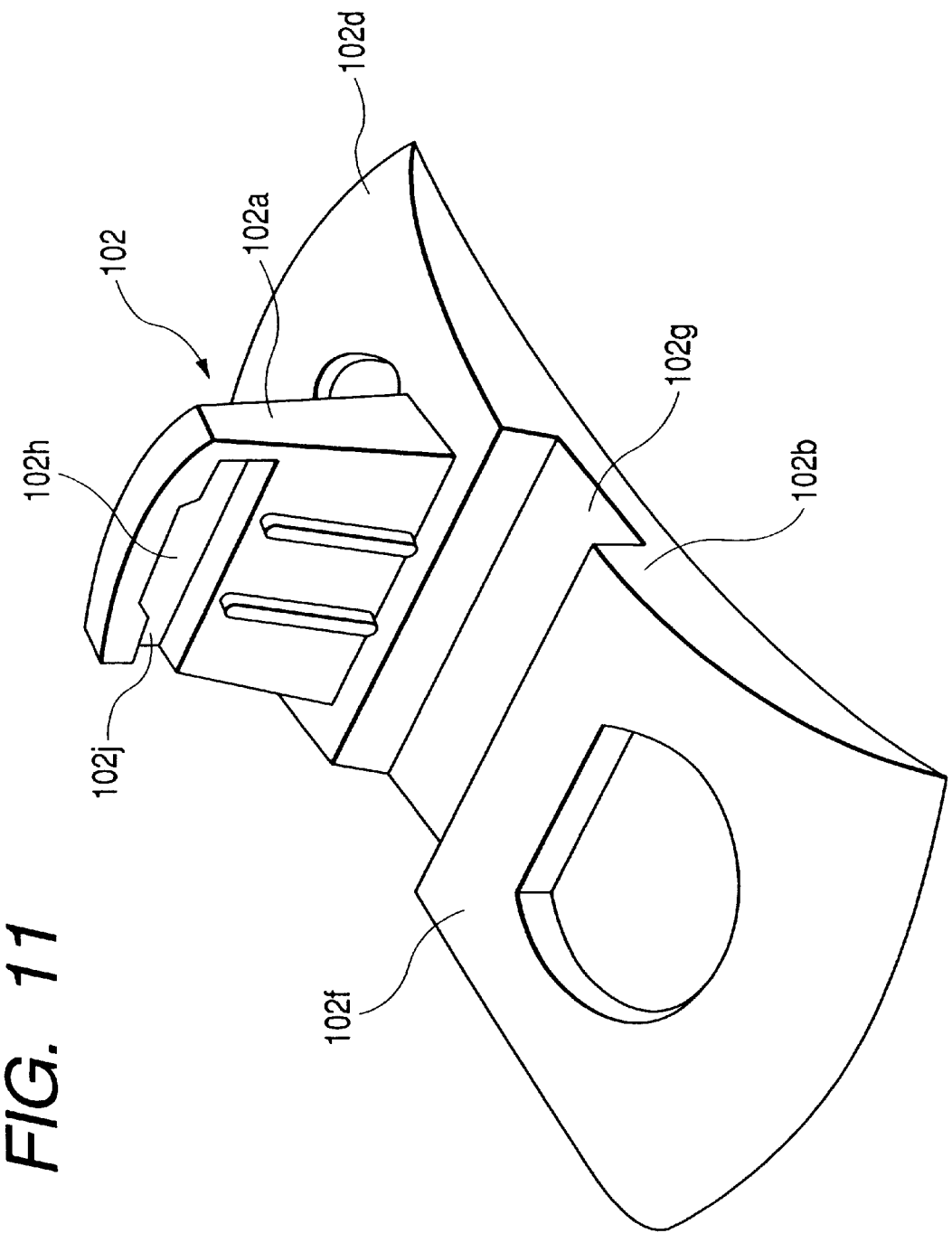
FIG. 11 is a perspective view of the stand member according to the third embodiment.
Figure 12:
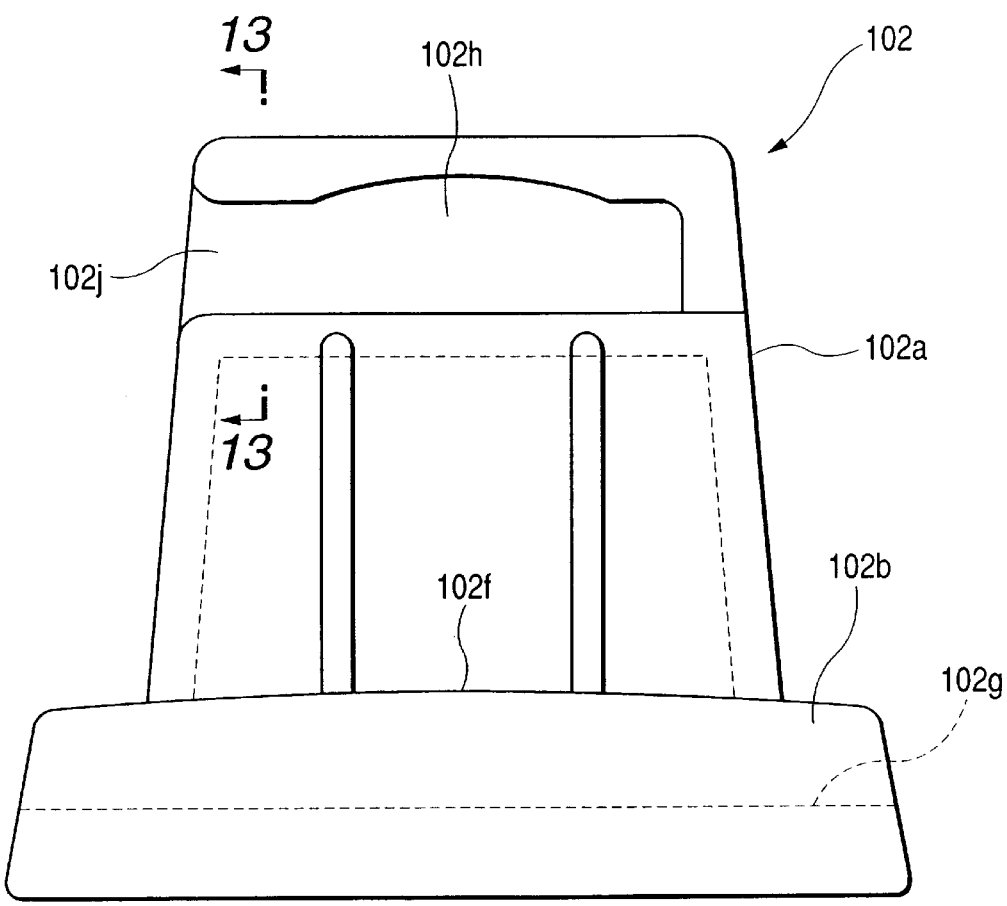
FIG. 12 is a front view of the stand member according to the third embodiment.
Figure 13:
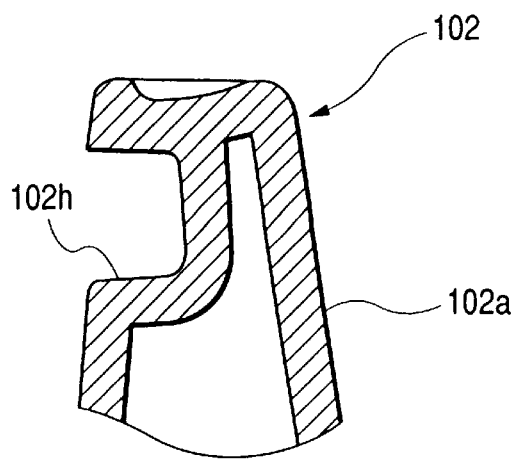
FIG. 13 is a sectional view taken along the line 13—13 in FIG. 12.

Further, since a recessed portion 102h of the stand member 102 shown in FIG. 11 is fitted on the projection 1k of the main body 3 of the scanner 100 by inserting the recessed portion 102h from an inlet 102j and since the front-and-rear width (width in left-and-right direction in FIG. 8) of the stand member 102 is greater than a thickness (thickness in left-and-right direction in FIG. 8) of the scanner 100, if any force trying to laying the scanner 100 down acts on the main body 3 accidentally, the scanner is not laid down laterally.

As shown in FIG. 3, when the operator sets an original P on the original stage glass 1d, since the front end support portion 102b is positioned not to interfere with the opening and closing of the pressure plate 1b, the pressure plate can be opened and closed in a normal manner.

Figure 10:
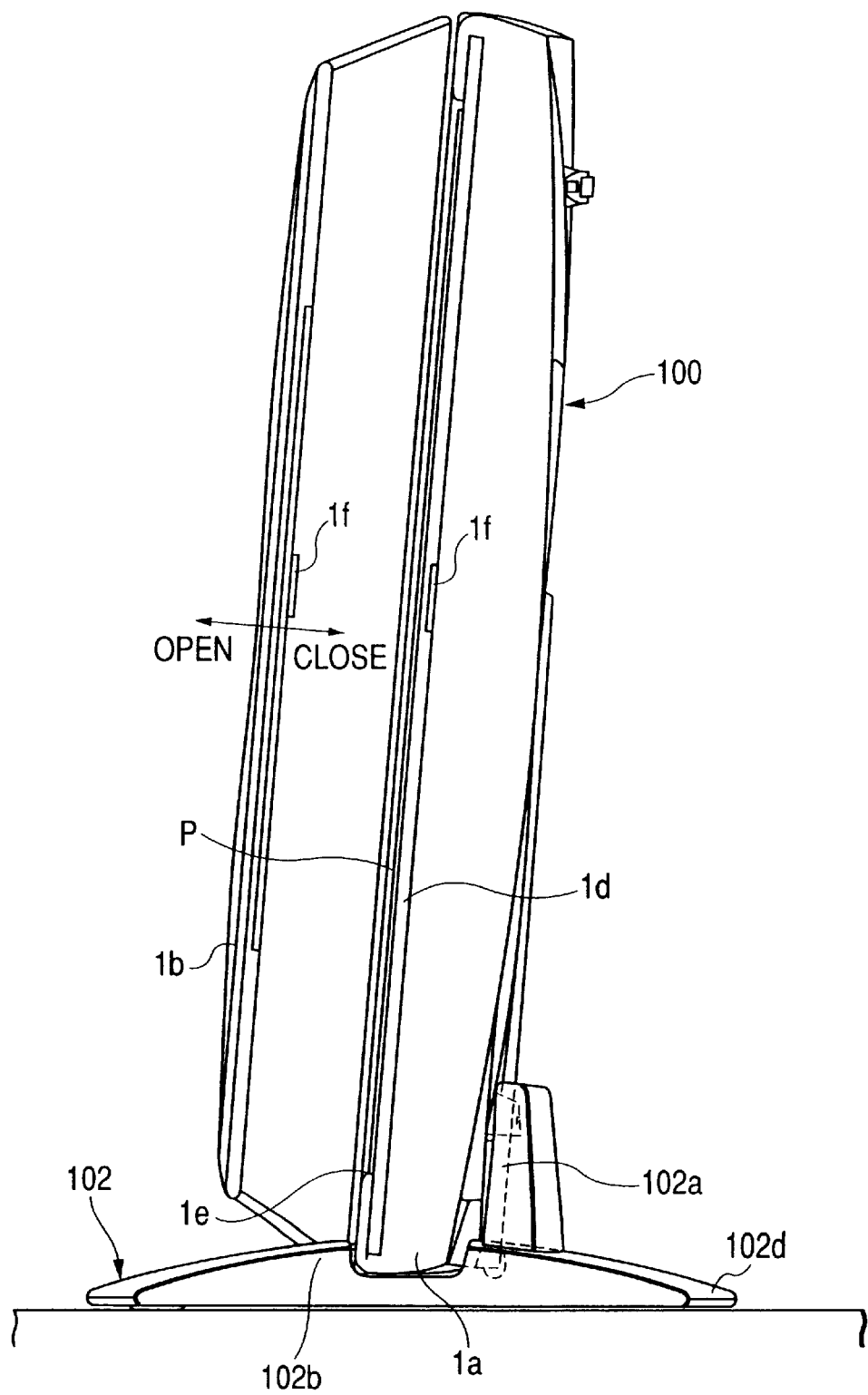
FIG. 10 is a side view showing the stand member according to the third embodiment, and the scanner as the image reading apparatus having such a stand member, in a condition that a pressure plate is opened.

As shown in FIG. 10, in a condition that the pressure plate 1b is opened, the original P can be set along an original abut reference 1e, and, when the pressure plate 1b is closed by its own weight, the original P can be closely contacted with the original stage glass 1d.

In this case, as in the first embodiment, magnets 1f as shown in FIG. 3 may be provided on opposed surfaces between the pressure plate 1b and the lower frame 1a to closely contact the original P with the original stage glass 1d more positively, thereby reading an image on the original more correctly to obtain better image quality. Incidentally, in place of the magnets, face fasteners may be used.

Fourth Embodiment

As is in the stand member 12 for the scanner 1 according to the second embodiment, also in the stand member 102 for the scanner 100 according to the third embodiment, a member similar to the shiftable (capable of raising and falling) lever member (2e in FIG. 6) may be provided on the front end support portion 102b to stably fix the scanner 100 to the stand member 102.

In the stand member for the image reading apparatus according to the present invention, even when the image reading apparatus is used in the vertically installed condition, the vertically installed condition can be maintained stably, and, if the great force acts on the apparatus accidentally, the apparatus is hard to knock down, thereby preventing the damage of the image reading apparatus.

In the stand member for the image reading apparatus according to the present invention, when the height of the rear side protruded portion is selected to the height of the front side protruded portion (among the pair of protruded portions), in spite of the fact that the image reading apparatus is frequently pushed rearwardly during the use of the apparatus, the image reading apparatus can positively be prevented from being laid down rearwardly.

In the stand member for the image reading apparatus according to the present invention, when the pair of protruded portions serve to hold the image reading apparatus in the vertically installed condition with slightly inclined rearwardly, the use of the image reading apparatus can be facilitated.

Since the stand member for the image reading apparatus according to the present invention is formed from synthetic resin material, the stand member is cheap and does not damage the image reading apparatus.

In the stand member for the image reading apparatus according to the present invention, among the pair of protruded portions, when the front side protruded portion is provided with a fixing means for holding a lid opening/closing means for closely contacting the original rested on the original resting stage of the image reading apparatus with the original resting stage in a closed condition, accidental opening of the lid opening/closing means can be prevented, thereby preventing the image reading apparatus and the stand member from being laid down.

The image reading apparatus having the stand member according to the present invention can be used substantially without laid-down in the vertically installed condition supported by the stand member.

In the image reading apparatus having the stand member according to the present invention, when the main body is supported on the installation surface by resting the stand member provided at one end of the main body and the other end of the main body on the installation surface, the image reading apparatus can positively be used in the vertically installed condition without laid-down.

In the image reading apparatus having the stand member of the present invention, when the engaged portion detachably engaging by the engaged portion is provided, the stand member can positively be engaged by the main body of the image reading apparatus, thereby preventing the image reading apparatus from being laid down.

In the image reading apparatus having the stand member of the present invention, when the main body is provided at its back surface with a plurality of projections for supporting the main body on the installation surface when the main body is laid down, and, among the plurality of projections, the projection located downwardly when the main body is positioned in a vertically installed condition also acts as the engaged portion, the construction can be made simpler.

What is claimed is:

1. A stand member for an image reading apparatus, comprising:

a pair of front and rear protruded portions, wherein a lower part of the image reading apparatus disposed in a vertically installed condition is adapted to be received between said pair of protruded portions to support the image reading apparatus in a vertically installed condition, and a lay-down position of the image reading apparatus in a front-and-rear direction is regulated by said pair of protruded portions, and wherein said front protruded portion includes fixing means adapted to hold a lid opening/closing means for closely contacting an original rested on an original resting stage of the image reading apparatus with the original resting stage in a closed condition.

2. An image reading apparatus, comprising:

a main body including an original resting stage on which an original is rested;

image reading means for reading the original rested on said original resting stage;

lid opening/closing means for closely contacting the original rested on said original resting stage with said original resting stage and adapted to be used in a laid-down condition; and a stand member provided detachably on said main body, said stand member including a pair of front and rear protruded portions, wherein a lower part of said main body disposed in a vertically installed condition is received between said pair of protruded portions to support said main body in a vertically installed condition, and a lay-down position of said main body in a front-and-rear direction is regulated by said pair of protruded portions.

3. An image reading apparatus according to claim 2, wherein said main body is supported on an installation surface by resting said stand member provided at one end of said main body and resting an opposite end of said main body on said installation surface.

4. An image reading apparatus according to claim 2, further comprising connecting means for connecting said main body to said stand member, said connecting means includes an engaged portion provided on a back surface of said main body, and an engagement portion provided on said rear protruded portion and capable of detachably engaging with said engaged portion.

5. An image reading apparatus according to claim 4, wherein a detachably engaging direction along which said engaged and engagement portions are engaged with each other is a left-and-right direction.

6. An image reading apparatus according to claim 5, wherein said recessed portion and said protrusion are directed in a left-and-right direction.

7. An image reading apparatus according to claim 6, wherein said main body is provided on its back surface with a plurality of projections for supporting said main body in a lay-down position, with said plurality of projections directed downwardly when said main body is positioned in a vertically installed condition and serving as said engaged portion.

8. An image reading apparatus according to claim 4, wherein one of said engaged and engagement portions is a recessed portion and the other is a protrusion.

9. An image reading apparatus according to claim 8, wherein said recessed portion and said protrusion are directed in a left-and-right direction.

10. An image reading apparatus according to claim 4, wherein a detachably engaging direction along which said engaged and engagement portions are engaged with each other is an up-and-down direction.

11. An image reading apparatus according to claim 2, wherein a top portion of said front protruded portion is shaped to be complementary to an edge of said opening/closing means so as not to interfere with the opening and closing of said opening/closing means.

12. An image reading apparatus, comprising:
    a main body including an original resting stage on which an original is rested;
    image reading means for reading the original rested on said original resting stage;
    lid opening/closing means for closely contacting the original rested on said original resting stage with said original resting stage; and
    a stand member comprising a pair of front and rear protruded portions and detachably provided on said main body, said stand member vertically supporting said main body, wherein
    a lower part of said main body disposed in a vertically installed condition is received between said pair of protruded portions to support said main body in the vertically installed condition, and an incline of said main body in a front-and-rear direction is regulated by said pair of protruded portions, and wherein
    said front protruded portion includes fixing means for holding said lid opening/closing means in a closed condition.

13. An image reading apparatus, comprising:
    a main body including an original resting stage on which an original is rested;
    image reading means for reading the original rested on said original resting stage;
    lid opening/closing means for closely contacting the original rested on said original resting stage with said original resting stage; and
    a stand member comprising a pair of front and rear protruded portions and detachably provided on said main body, said stand member vertically supporting said main body, wherein
    a lower part of said main body disposed in a vertically installed condition is received between said pair of protruded portions to support said main body in the vertically installed condition, and an incline of said main body in a front-and-rear direction is regulated by said pair of protruded portions, and wherein
    a top portion of said front protruded portion is shaped to be complementary to an edge of said opening/closing means so as not to interfere with the opening and closing of said opening/closing means.

14. An image reading apparatus according to claim 13, wherein both edges of said lid opening/closing means and said top portion of said front protruded portion are inclined.

15. An image reading apparatus according to claim 14, further comprising connecting means for connecting said main body to said stand member, said connecting means includes an engaged portion provided on a back surface of said main body, and an engagement portion provided on said rear protruded portion and capable of detachably engaging with said engaged portion.

16. An image reading apparatus according to claim 15, wherein said pair of protruded portions hold said main body apparatus in the vertically installed condition in such a manner that said main body is inclined rearwardly.

17. An image reading apparatus according to claim 16, wherein said main body is supported on an installation surface by resting said stand member provided at one end of said main body and resting an opposite end of said main body on said installation surface.

18. An image reading apparatus according to claim 17, wherein a height of said rear protruded portion is greater than a height of said front protruded portion.

19. An image reading apparatus according to claim 18, wherein said engaged portions are recessed portions and said engagement portion is a protrusion.

20. An image reading apparatus having a stand member according to claim 19, wherein a detachably engaging direction along which said engaged and engagement portions are engaged with each other is an up-and-down direction.

21. An image reading apparatus, comprising:
    an image reader;
    a stand member comprising a pair of front and rear protruded portions, wherein a lower part of said image reader disposed in a vertically installed condition is received between said pair of protruded portions to support said image reader in the vertically installed condition, and an incline of said image reader in a front-and-rear direction is regulated by said pair of protruded portions, and
    connecting means for connecting said image reader to said stand member, said connecting means includes an engaged portion provided on a back surface of said image reader, and an engagement portion provided on said rear protruded portion and capable of detachably engaging with said engaged portion,
    wherein said engaged portions are recessed portions and said engagement portion is a protrusion.

22. An image reading apparatus according to claim 21, wherein said recessed portions and said protrusions are directed in an up-and-down direction.

23. An image reading apparatus, comprising:
    an image reader; and
    a stand member comprising a pair of front and rear protruded portions, wherein a lower part of said image reader disposed in a vertically installed condition is received between said pair of protruded portions to support said image reader in the vertically installed condition, and an incline of said image reader in a front-and-rear direction is regulated by said pair of protruded portions, wherein
    said image reader is supported on an installation surface by resting said stand member provided at one end of said image reader and resting an opposite end of said image reader on said installation surface.

24. An image reading apparatus according to claim 23, further comprising connecting means for connecting said image reader to said stand member, said connecting means including an engaged portion provided on a back surface of said image reader, and an engagement portion provided on said rear protruded portion and capable of detachably engaging with said engaged portion.

25. An image reading apparatus according to claim 24, wherein a detachably engaging direction along which said engaged and engagement portions are engaged with each other is a left-and-right direction.

26. An image reading apparatus according to claim 25, wherein said image reader is provided on its back surface with a plurality of projections for supporting said image reader on an installation surface when said image reader is in a lay-down position, with said plurality of projections located downwardly when said image reader is positioned in a vertically installed condition and acting as said engaged portion.

* * * * *

UNITED STATES PATENT AND TRADEMARK OFFICE
CERTIFICATE OF CORRECTION

PATENT NO.    : 6,311,940 B1
DATED         : November 6, 2001
INVENTOR(S)   : Masato Koshimizu It is certified that error appears in the above-identified patent and that said Letters Patent is hereby corrected as shown below:

<u>Column 2,</u>
Line 11, "apparats" should read -- apparatus --.

<u>Column 3,</u>
Line 39, "canner" should read -- scanner --.

<u>Column 5,</u>
Line 9, "Ic" should read -- 1c --.

<u>Column 7,</u>
Line 55, "without" should read -- without being --.
Line 63, "without" should read -- without being --.
Line 67, "engaging" should read -- engaged --.

Signed and Sealed this

Twenty-fifth Day of June, 2002

*Attest:*

*Attesting Officer*

JAMES E. ROGAN
*Director of the United States Patent and Trademark Office*